Patented Oct. 11, 1932

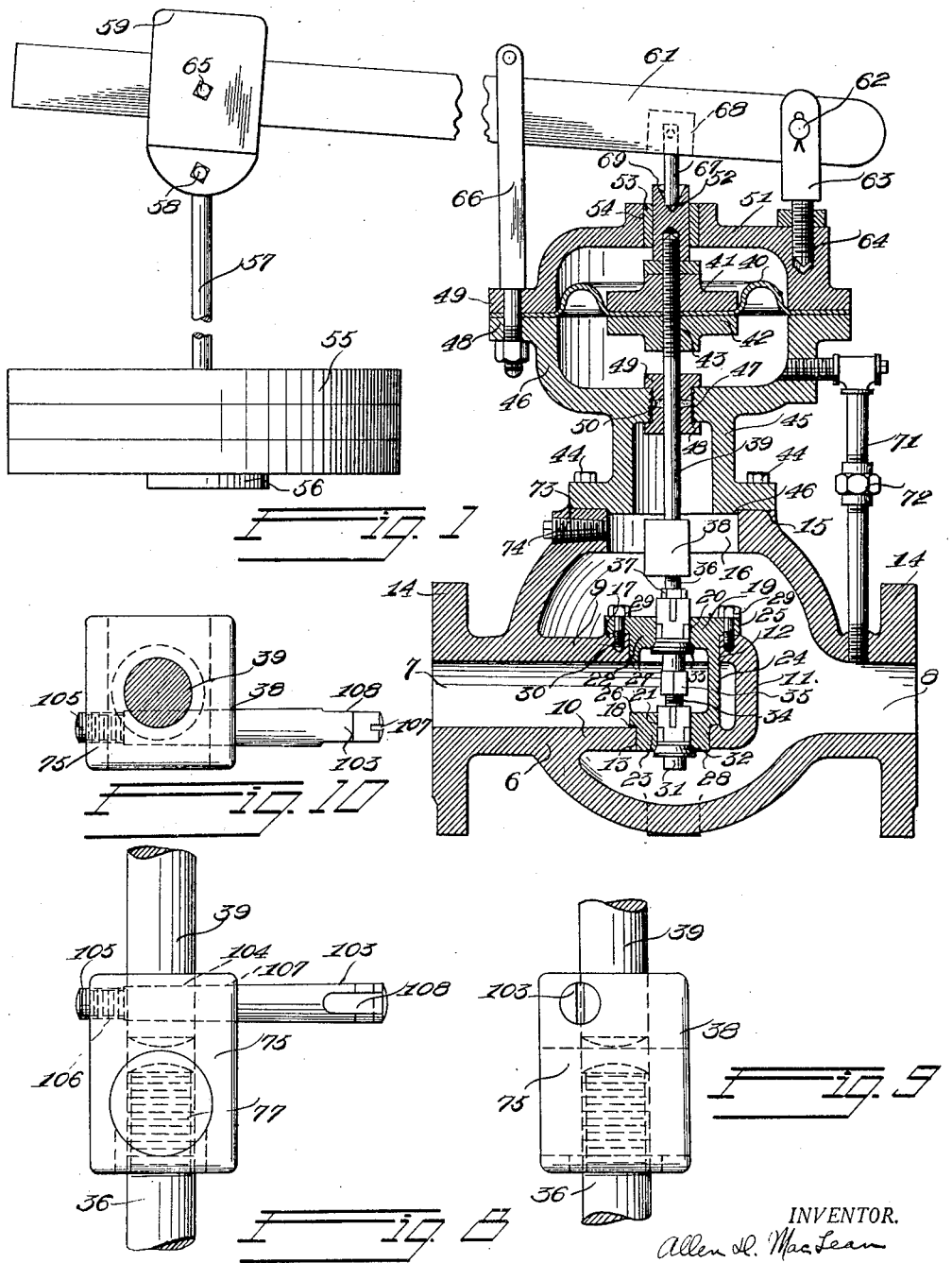

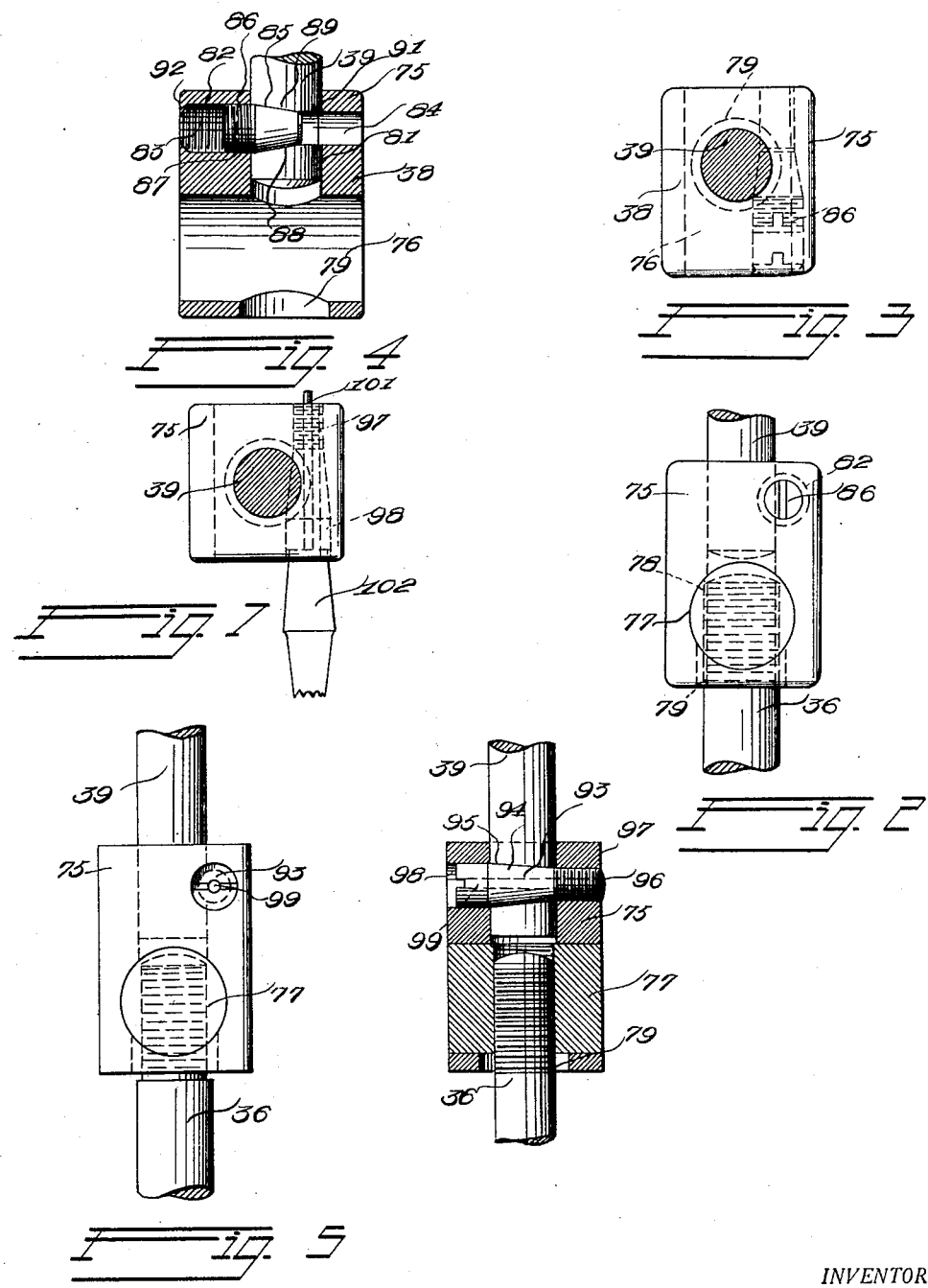

1,881,775

UNITED STATES PATENT OFFICE

ALLEN D. MacLEAN, OF PITTSBURGH, PENNSYLVANIA, ASSIGNOR TO PITTSBURGH EQUITABLE METER COMPANY, OF PITTSBURGH PENNSYLVANIA, A CORPORATION OF PENNSYLVANIA

AUTOMATIC REGULATOR

Application filed June 18, 1928. Serial No. 286,448.

The present invention relates to an automatically operating valve of the type that is used to regulate the flow of fluids in conduits subject to conditions that tend to normally produce an irregular rate of flow.

More specifically the invention relates to regulator valves of the type disclosed in copending application, Serial No. 197,386, filed June 8, 1927, in which the fluid control valves and seats therefor are readily removable from the valve body for repair or replacement. The present invention is an improvement upon the arrangement disclosed in said application.

In regulator valves of the type disclosed in said application, and, in fact, in all such valves, it is frequently necessary to gain access to the valves and valve seats. This is generally difficult due to the fact that the valve actuating mechanism extends across the line of separation between the valve body and the portion of the regulator that contains the diaphragm and associated parts, so that while it is customary to so construct regulator valves so that the valve body may be readily detached from the diaphragm casing, the physical separation of said body and casing is generally difficult due to the necessity for detaching the valve stem from its connection to parts secured to the diaphragm. Constructions heretofore proposed have included various arrangements to permit disconnection of the valve stem from the diaphragm or parts carried thereby, but such constructions frequently required partial disassembly of the regulator to permit the separation of the valve stem from its actuating mechanism so that the diaphragm casing could be removed from the valve body.

By this invention, the separation of the valve stem from all connection to the diaphragm is made possible prior to the separation of the valve body and the diaphragm casing, so that when said casing is removed, no internal connections with the valve can prevent the removal of said casing and all its parts as a unit from the valve body.

The primary object of this invention accordingly is to provide means for facilitating the assembling and disassembling of valves of the above referred to character to give ready access to the valves and valve seats within the valve body.

A further object of this invention is the provision of improved means for conveniently and simply disconnecting the valve or valves of a regulator from their controlling diaphragm from the exterior thereof and prior to any separation of the diaphragm casing from the valve body, so that the subsequent separation of said casing as a unit from said body may readily be effected.

A further object of the invention is to provide a regulator embodying a connection between the controlling diaphragm and valve stem that is accessible from the exterior of the regulator and includes relatively movable parts that can assume no position in which their connection or disconnection is difficult, and in which loss of parts within the valve body cannot occur.

A still further object of the invention is to provide a regulator including a coupling to connect the valve stem to the diaphragm which coupling is accessible for connection and disconnection from the exterior of the regulator and includes a flexible joint of simple construction facilitating the accurate seating of the valves.

Further objects of the invention will appear as a description thereof proceeds with reference to the accompanying drawings, in which, Figure 1 is a vertical sectional view of a regulator valve disclosing the application of my invention thereto.

Figure 2 is a side elevational view of a preferred form of my invention shown in operative position.

Figure 3 is a top plan view of the construction disclosed in Figure 2 with the valve actuating rod in section.

Figure 4 is a vertical sectional view of the construction disclosed in Figure 2 with parts omitted.

Figure 5 is a side elevational view of a modified form of my invention.

Figure 6 is a vertical sectional view of the construction disclosed in Figure 5.

Figure 7 is a top plan view of the construction disclosed in Figure 5 with the valve actuating rod in section.

Figure 8 is a side elevational view of a further modification of my invention.

Figure 9 is a side elevational view at right angles to Figure 8 and Figure 10 is a top plan view of the construction disclosed in Figure 9 with the valve actuating rod in section.

As shown in Figure 1, a regulator of the type disclosed in said co-pending application is shown which comprises the valve body 6 having an inlet 7 and an outlet 8. Inlet 7 is separated from outlet 8 by an open sided box like separating structure including top and bottom portions 9 and 10 and closed sides 11. Openings in axial alignment 12 and 13 are formed through portions 9 and 10 respectively.

Body 6 is provided with the usual connecting flanges 14 surrounding the inlet and outlet of the body, and a flat surface 15 at right angles to the axis of openings 12 and 13 before referred to. A further opening 16 having its axis in alignment with the axes of openings 12 and 13 is provided in the body 6. It will be observed that the openings 16, 12 and 13 are respectively of diminishing diameters. Portions 9 and 10 are provided with annular short projections 17 and 18 surrounding openings 12 and 13 respectively.

A unitary cage 19 shown in Figure 1, is secured within valve body 6. Cage 19 has aligned openings 20 and 21 formed in portions 22 and 23 that are connected in spaced relation by webs 24, preferably two in number, though other spacing and connecting constructions may be used the desideratum being that a cage of skeleton form be provided so that the fluid may flow from inlet 7 between webs 24 and through openings 20 and 21 to outlet 8 when the valve, presently to be described is open.

Portions 22 and 23 include flanges 25 and 26, designed to rest on the projections 17 and 18, and annular positioning portions 27 and 28 fitting within openings 12 and 13 before referred to. The contacting surfaces may be finished to secure an accurate fit between the cage 19 and portions 9 and 10.

The cage is secured in position by stud bolts 29 engaging threaded openings 30 in portion 9. It will be observed that the maximum diameter of cage 19 is less than the diameter of opening 16 and that the heads of stud bolts 29 are readily accessible through said opening. By this arrangement the cage may be readily removed and replaced in the valve body through opening 16. As the outside diameters of the cage diminish in the direction of movement when it is replaced it is apparent that the insertion of the cage can be simply and efficiently accomplished. This is a feature of importance as servicing of the valve is thus simplified.

The flow of fluid is controlled by a movable valve element 31 comprising two valves 32 and 33 having suitable seats engaging corresponding seats in openings 20 and 21. Valve 32 is provided with a threaded opening designed to receive a threaded stem 34, projecting from valve 33. A suitable wrench engaging head 35 is provided adjacent stem 34 to facilitate the adjustment of stem 34 to thereby space the valves 32 and 33 to accurately bring them to proper relative position. This adjustment can be properly made before the valve element and cage are placed in the valve body, head 35 being then accessible to effect the needed adjustment to insure accurate seating of the valves.

A threaded stem 36 is held in adjustable position by a nut 37 in a threaded bore in valve 33. The outer end of stem 36 is removably secured in coupling 38 forming the particular improvement of the present application and to which the inner end af a valve actuating rod 39 is detachably secured the movements of said rod being controlled by the movements of a diaphragm 40 secured between two abutments 41 and 42 adjustable on the threaded outer end 43 of rod 39.

Secured to the valve body 6 on surface 15 by bolts or studs 44 is a casting 45 having a locating projection 46 engaging the upper edge of the opening 16. Said casting is provided with an inwardly projecting annular flange 47 providing an aperture which is threaded to receive externally threaded sleeves 48 and 49 surrounding rod 39 between which a gasket 50 is clamped to provide a fluid tight joint between the rod 39 and the diaphragm chamber. The diaphragm chamber is formed by providing casting 45 with a bowl shaped enlargement 46 having a flange 48 to which is secured a flange 49 of an inverted bowl shaped casting 51, the diaphragm 40 being clamped between flanges 48 and 49 as clearly shown in Figure 1. In order to insure movement of rod 39 with its axis coincident with the axis of openings 20 and 21 said rod has secured to its threaded upper end a guide member 52 that is free to slide in a bushing 53 provided in opening 54 in casting 51, the axes of bushing 53 and member 52 being coincident with the axis of said openings. The movable valve element is biased toward open position by counterweights 55 supported on a disk 56 secured to a rod 57 pivoted at 58 to a sleeve 59 that is slidably adjustable along a lever 61 pivoted at 62 between the legs of a yoke 63 having a threaded stem screwed into a threaded bore 64 in casting 51. A set screw 65 holds the sleeve 59 in adjusted position on lever 61. Suitable lever guiding means 66 is secured to flanges 48 and 49 to control the movement of lever 61.

The effect of counterweights 55 is communicated to the movable valve element 31 by a projection 67 preferably pivoted in a recess 68 in lever 61, said projection having its end resting in a recess 69 in guide member 52.

The pressure in the conduit, preferably at the outlet side of the valve body is applied to diaphragm 40 by connecting valve body 6 with the chamber beneath the diaphragm by a pipe 71. Preferably pipe 71 is made in sections the ends of which are threaded to receive a coupling sleeve 72, whereby the pipe sections may be readily separated when it is desired to remove casting 45 to secure access to the valve cage 19 and movable valve element 31.

In accordance with the present invention valve body 6 is provided adjacent the top thereof with a threaded bore 73 for access to coupling 38 whereby valve stem 36 and valve actuating rod 39 may be disconnected in order that casting 45 and all parts carried thereby may be removed as a unit after the disconnection of sleeve 72. Bore 73 is normally closed by a threaded plug 74.

In the preferred form of the invention as illustrated in Figures 2, 3 and 4 coupling 38 comprises a block 75 provided with a horizontally extending circular bore 76 in which is mounted a cylindrical member 77 provided with a transversely extending threaded bore 78 for detachable connection with the outer threaded end of valve stem 36 which extends through an aperture 79 in block 75 in vertical alinement with bore 78. Further, formed in block 75 is a bore 81 disposed in vertical alinement with aperture 79 for the reception of the inner end of valve actuating rod 39. Formed in block 75 adjacent the top thereof parallel to bore 76 is a bore 82 which as shown in Figure 4 communicates with bore 81 at one side thereof. As indicated in Figure 4 bore 82 comprises a threaded end 83 a reduced end 84 and an intermediate conical portion 85. Located in bore 82 is a screw plug or key 86 provided with a threaded cylindrical portion 87 for adjustable engagement with threaded end 83 and a conical portion 88 for engagement in conical portion 85 or bore 82. Plug or key 86 engages the walls of recess 89 in a side of valve actuating rod 39, recess 89 merging into a recess 91 conforming to reduced end 84 of bore 82. After the introduction of screw plug 86 in bore 82 threaded end 83 is peened over as indicated at 92 to prevent withdrawal of said plug from said bore while permitting the plug to be threadedly moved into and out of engagement with recess 89.

In the operative position of connector 38 as shown in Figure 1 bore 82 is in transverse alinement with bore 73 in body 6 whereby, upon removal of plug 74, a suitable tool such as a screw driver may be inserted in alined bores 73 and 82 and engaged with plug or key 86 for moving it into or out of engagement with recess 89.

It will be seen upon inspection of Figure 1 that the construction of the regulator valve therein disclosed is such that in the absence of means for disconnecting valve stem 36 and valve actuating rod 39 it would be necessary to disassemble a large number of the parts before access could be gained to cage 19 for removing the fluid controlling valves but by means of my invention valve stem 36 and rod 39 can readily be disconnected by introducing a screwdriver into alined bores 73 and 82 and withdrawing plug 86 from engagement with recess 89 thereby permitting rod 39 to be readily retracted from bore 81 upon removal of studs 44 and sleeve 72 thus permitting the entire assemblage associated with casting 45 to be removed as a unit, from body 6 whereby cage 19 can be removed in a minimum period of time with a corresponding reduction in cost for replacing, adjusting or repairing the valves.

In reassembling the reverse operations are carried out and as will be particularly noted from Figure 4 the conical portion 88 upon moving plug 86 into locking engagement with rod 89 will engage conical recess 89 therein with a wedging action and gradually draw rod 39 into locked position even though recess 89 is initially out of exact alinement with plug 86.

The threaded engagement of stem 36 with member 77 permits removal of connector 38 from stem 36 as well as an adjustment between valve 31 and diaphragm 40 and aperture 79 which as shown is larger than bore 78 permits slight relative lateral pivotal movement between stem 36 and block 75 through rotation of member 77 in bore 76.

This provides, in effect, a flexible connection between the stem 36 and the rod 39, insuring against a possible inaccurate seating of the valves due to the fact that said rod and stem are not precisely straight, or if irregularities develop in the valves and the valve seats under conditions of actual service. The stem 36 simply flexes with respect to the block 75 if the frusto-conical valves in engaging their inclined seats tend to flex said stem. This action is automatic and results in an accurate seating of the valves.

In the modification disclosed in Figures 5, 6 and 7 in which parts similar to like parts disclosed in the first form of the invention are designated by like reference characters. Screw plug 93 is provided with a conical portion 94 of a length substantially equal to the diameter of rod 39 for engagement with a conical recess 95 in rod 39 and the reduced cylindrical end 96 is threaded for engagement with a reduced threaded end 97 of bore 98 in block 75. In this form of the invention plug 93 is provided with an axial bore 99 for the reception of a pin 101 carried by the end of a screwdriver 102 (Figure 7) to facilitate introduction to and removal from bore 98 of plug 93 through bore 73 by maintaining the screwdriver in engagement with the slot in the end of said plug.

At the same time pin 101 prevents the plug 94 from falling into the valve body after it is withdrawn from threaded engagement with the bore 97, since after said plug is withdrawn it is telescoped on said pin. Said pin is made of a length sufficient to prevent the plug from dropping through the space between the valve body adjacent opening 73, and of a diameter sufficiently less than that of the plug so that the projection of said pin through the conical portion 94 will not interfere with the insertion or removal of the rod 39 from its socket in block 75. That is, said pin does not project into the path of movement of said rod. In reassembling the regulator, the plug 93 is telescoped on pin 101, said pin serving as a pilot to bring the plug conveniently into registry with the bore provided to receive it, while at the same time said pin serves to guide the screw driver into the screw driver slot provided in the end of said plug in reinserting said plug.

In the form of the invention disclosed in Figures 8, 9 and 10 the valve rod securing is in the form of a comparatively long tapered pin 103 for engagement with a correspondingly tapered recess 104 in rod 39 and is provided with a threaded cylindrical end 105 for threaded engagement with a threaded cylindrical bore 106 in block 75 which merges into a tapered bore 107 conforming to tapered pin 103. The outer end of pin 103 in operative position of coupling 38 is disposed adjacent the inner end of bore 73 and is provided with tool engaging kerf 107 and is flattened on opposite sides as indicated at 108 for application of a suitable tool such as a wrench after withdrawal of the outer end from bore 73.

The pin 103 cannot possibly drop into the valve body because its length is such that when it is withdrawn from its operative position it projects through the bore 73 to such an extent that it will be held therein from the assumption of the angular position that it would necessarily have to assume before it could drop into the valve body.

From the foregoing disclosure it will be seen that means are provided for facilitating the disassembly of the regulator in order to remove the fluid controlling valves or for any other purpose. The arrangement is simple in construction, reliable, effective and certain in operation and by the use thereof the cost for repairs and adjustments of valves of the character above referred to is greatly reduced.

While I have described my invention in detail, I do not limit myself to such details but claim not only the various alternative illustrated and described but all others falling within the terms of the subjoined claims.

Accordingly what I claim and desire to secure by United States Letters Patents, is:—

1. In combination with a regulator valve comprising a valve chamber, a diaphragm chamber detachably supported on said valve chamber and forming therewith a closed passageway, valves detachably supported in said valve chamber, a diaphragm supported in said diaphragm chamber, a valve stem carried by said valve, an actuating rod carried by said diaphragm and completely enclosed in said passageway, and means accessible without separating said casing and body for detachably and adjustably coupling said valve stem and actuating rod, said means comprising a block provided with a threaded bore for engagement with a threaded end of said valve stem; a second bore for detachable engagement with one end of said valve actuating rod; and means movable into said first named bore in said block for engagement with said valve actuating rod for retaining same in said second bore said last named means being so disposed as to maintain substantial registry with said bore when in inoperative position.

2. A regulator valve comprising a valve body, a diaphragm casing removably secured to said valve body and forming therewith a closed passageway, a valve in said body, a diaphragm in said casing, and a conection in said passageway between said valve diaphragm comprising a releasable coupling controllable from the exterior of the regulator valve for connecting or disconnecting said valve from said diaphragm, said releasable coupling including a movable key within the regulator and means associated therewith to prevent the movement of said key otherwise than toward and from its operative position.

3. A regulator valve comprising a valve body, a diaphragm casing detachably secured to said body, a valve in said body, a diaphragm in said casing, and a connection between said diaphragm and said valve, said connection comprising a releasable coupling including a key movable at an angle to said connection, means to provide access to said key from the exterior of the regulator valve, and means to limit the movement of said key except toward and from its operative position.

4. In combination, a regulator valve comprising a valve body, a diaphragm casing detachably supported on said valve body and forming therewith a closed passageway, a valve assembly detachably supported in said valve body, a diaphragm supported in said diaphragm casing, a valve stem carried by said valve assembly, a valve actuating stem movable by said diaphragm, and means for connecting and disconnecting said valve stem and actuating stem without separating said valve body and diaphragm casing, said means comprising a block having two bores for receiving the two stems, one stem having a notch therein, a tapered key threaded into a bore of said block and movable into and out of the notch of said stem, and means to limit the withdrawal of said key whereby said key may not be removed from said block, and removable means giving access to said key.

5. The invention as defined in claim 4 wherein said block is provided with a third bore at right angles to and intersecting one of said first named bores, a cylindrical member in said third bore, one stem being screw-threadedly engaged in an opening in said cylindrical member.

6. In combination, a regulator valve comprising a valve body, a diaphragm casing detachably supported on said valve body, a valve assembly in said valve body, a valve stem carried by said valve assembly, a diaphragm in said diaphragm casing, a valve actuating stem operated by said diaphragm, and means for connecting and disconnecting said valve stem and diaphragm stem without separating said valve body and diaphragm casing, said means comprising a block having bores extending thereinto from opposite sides for receiving the two stems one of said bores being larger than the stem received therein, a cross-bore in said block at right angles to and intersecting one of said first named bores, a cylindrical member in said cross bore having a threaded opening, one of said stems passing loosely through the larger bore in said block and being threaded into said cylindrical member, the other stem having an opening therein, and a locking key threaded into said block and engaging the opening in said stem to lock the same to said block.

7. The invention as defined in claim 6 wherein said block has means to allow limited movement of said threaded locking key whereby said key may not be removed from the block.

In testimony whereof I affix my signature.

ALLEN D. MacLEAN.